United States Patent [19]
Komaki et al.

[11] Patent Number: 5,721,621
[45] Date of Patent: Feb. 24, 1998

[54] IMAGE FORMING SYSTEM WITH TEMPORARY AND EMERGENCY STOP MEANS

[75] Inventors: Yoshio Komaki, Yokohama; Kazuyoshi Takahashi, Kawasaki, both of Japan

[73] Assignee: Canon Kabushiki Kaisha, Tokyo, Japan

[21] Appl. No.: 781,916

[22] Filed: Dec. 30, 1996

Related U.S. Application Data

[63] Continuation of Ser. No. 22,357, Feb. 25, 1993, abandoned.

[30] Foreign Application Priority Data

Feb. 26, 1992 [JP] Japan ................. 4-039166
Feb. 15, 1993 [JP] Japan ................. 5-025657

[51] Int. Cl.$^6$ .......................... H04N 1/00; G03G 21/00
[52] U.S. Cl. .................... 358/296; 355/202; 355/313; 355/314
[58] Field of Search ....................... 355/200–209, 355/313–314, 308–310; 358/406, 468, 486, 498, 296–303, 304

[56] References Cited

U.S. PATENT DOCUMENTS

| Re. 34,685 | 8/1994 | Negishi et al. ............ 355/206 |
|---|---|---|
| 4,297,025 | 10/1981 | Bach et al. ............ 355/14 |
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,723,129 | 2/1988 | Endo et al. . |
| 4,740,796 | 4/1988 | Endo et al. . |
| 4,956,667 | 9/1990 | Gartner ............ 355/202 |
| 5,023,728 | 6/1991 | Nimura et al. ............ 358/437 |
| 5,148,286 | 9/1992 | Knodt et al. ............ 358/296 |
| 5,152,001 | 9/1992 | Hanamoto ............ 395/800 |
| 5,170,184 | 12/1992 | Hanabusa et al. . |
| 5,182,597 | 1/1993 | Masuda et al. ............ 355/205 |
| 5,182,650 | 1/1993 | Inoue et al. ............ 358/296 |
| 5,206,735 | 4/1993 | Gauronski et al. ............ 358/296 |
| 5,248,996 | 9/1993 | Kato et al. ............ 346/76 |
| 5,355,151 | 10/1994 | Yoshida et al. ............ 347/61 |
| 5,365,349 | 11/1994 | Knodt et al. ............ 358/406 |

FOREIGN PATENT DOCUMENTS

| 0083419 | 7/1983 | European Pat. Off. . |
|---|---|---|
| 54-056847 | 5/1979 | Japan . |
| 54-059936 | 5/1979 | Japan . |
| 59-123670 | 7/1984 | Japan . |
| 59-138461 | 8/1984 | Japan . |
| 60-071260 | 4/1985 | Japan . |
| 60-204342 | 10/1985 | Japan . |

OTHER PUBLICATIONS

"Permanent Printhead Assembly for a Resistive Ribbon Typewriter or Printer" IBM Technical Disclosure Bulletin, vol. 30, No. 9, Feb. 1988, pp. 73–76.

*Primary Examiner*—Peter S. Wong
*Assistant Examiner*—K. Shin
*Attorney, Agent, or Firm*—Fitzpatrick, Cella, Harper & Scinto

[57] ABSTRACT

When a start signal is inputted to an image forming apparatus, initial settings of the reader unit and printer unit are respectively performed in a first step. In a second step, if the apparatus is in the temporary stop state, the operation waits until this state is canceled. During this waiting period, the apparatus does not performs scanning of the next scanning line. If the apparatus is not in the temporary stop state, the operation proceeds to a third step, where the reader units and the printer units start scanning. When print-scanning of one line is completed in a fourth step, the operation proceeds to a fifth step, where data required for the next scanning is transmitted to the reader unit and the printer unit. In a sixth step, the above operation is repeated until the entire image formation is completed.

30 Claims, 9 Drawing Sheets

IMAGE FORMING SYSTEM WITH TEMPORARY AND EMERGENCY STOP MEANS

This application is a continuation of application Ser. No. 08/022,357 filed Feb. 25, 1993, now abandoned.

BACKGROUND OF THE INVENTION

1. Field of the Invention

The present invention relates to an image forming system.

2. Related Background Art

An image forming apparatus, such as an ink-jet printer, forms an image by scanning a recording head relative to a recording medium a plurality of times. If there is a need to immediately stop the operation of such an image forming apparatus, for example, when trouble occurs during formation of an image, such a need can be answered only by turning off the power switch.

However, because power switches generally are not designed to be frequently operated; for instance, many apparatuses have power switches provided on their backs, power switches are not suitable for an emergency stop operation. Further, if the power is turned off, it resets all the data that has been inputted for the current image forming operation, such as image data and data regarding paper feeding. Therefore, there is a potential danger that an emergency stop operation performed by turning off the power switch may cause significant damage to the apparatus or result in an inconveniently long waiting time for restarting the apparatus.

Further, when a conventional image forming apparatus has run out of ink or paper during image formation, the power switch must be turned off to stop the apparatus in order to replenish ink or paper, and then it must be turned on to restart the image formation. Thus, an inconvenient switching operation and, further, a long waiting time for restarting are required.

The above problems are critical particularly in apparatuses for printing the same picture or document many times, such as a newspaper printing apparatus.

Further, it is also critical when an image forming apparatus does with a recording medium on which printing is stopped part way because of an emergency stop operation as described above.

SUMMARY OF THE INVENTION

Accordingly, an object of the present invention is to provide an image forming apparatus which eliminates some or all of the above-described problems.

Another object of the present invention is to provide an image forming apparatus which, when operation of the apparatus has been stopped, is able to restart the operation without causing any significant inconvenience.

Still another object of the present invention is to provide an image forming apparatus which achieves improved operability for printing on a continuous recording medium such as roll paper.

To achieve these objects, an aspect of the present invention provides an image forming apparatus comprising: image forming means for forming an image by performing record-scan a plurality of times; stop signal input means for inputting a stop signal designating a temporary stop of an image forming operation; stop cancellation signal input means for inputting a stop cancellation signal designating cancellation of a temporary stop of an image forming operation; determination means for finding whether the temporary signal has been inputted before the image forming means performs record-scanning; hold means for suspending record-scanning when the determination means finds that the temporary stop signal has been inputted; and stop cancellation means for restarting record-scanning which has been suspended, in response to input of the stop cancellation signal.

A further object of the present invention is to provide an image forming apparatus which is able to form images on practically any type of recording medium without causing any significant problems.

A still further object of the present invention is to provide an image forming apparatus which employs the ink-jet recording method and smoothly performs recording.

A further object of the present invention is to provide an image forming apparatus having a new function.

Further objects, features and advantages of the present invention will become apparent from the following description of the invention with reference to the attached drawings.

DETAILED DESCRIPTION OF THE PREFERRED EMBODIMENTS

The preferred embodiments of the present invention will be described hereinafter with reference to the attached drawings.

FIRST EMBODIMENT

Figure 1:
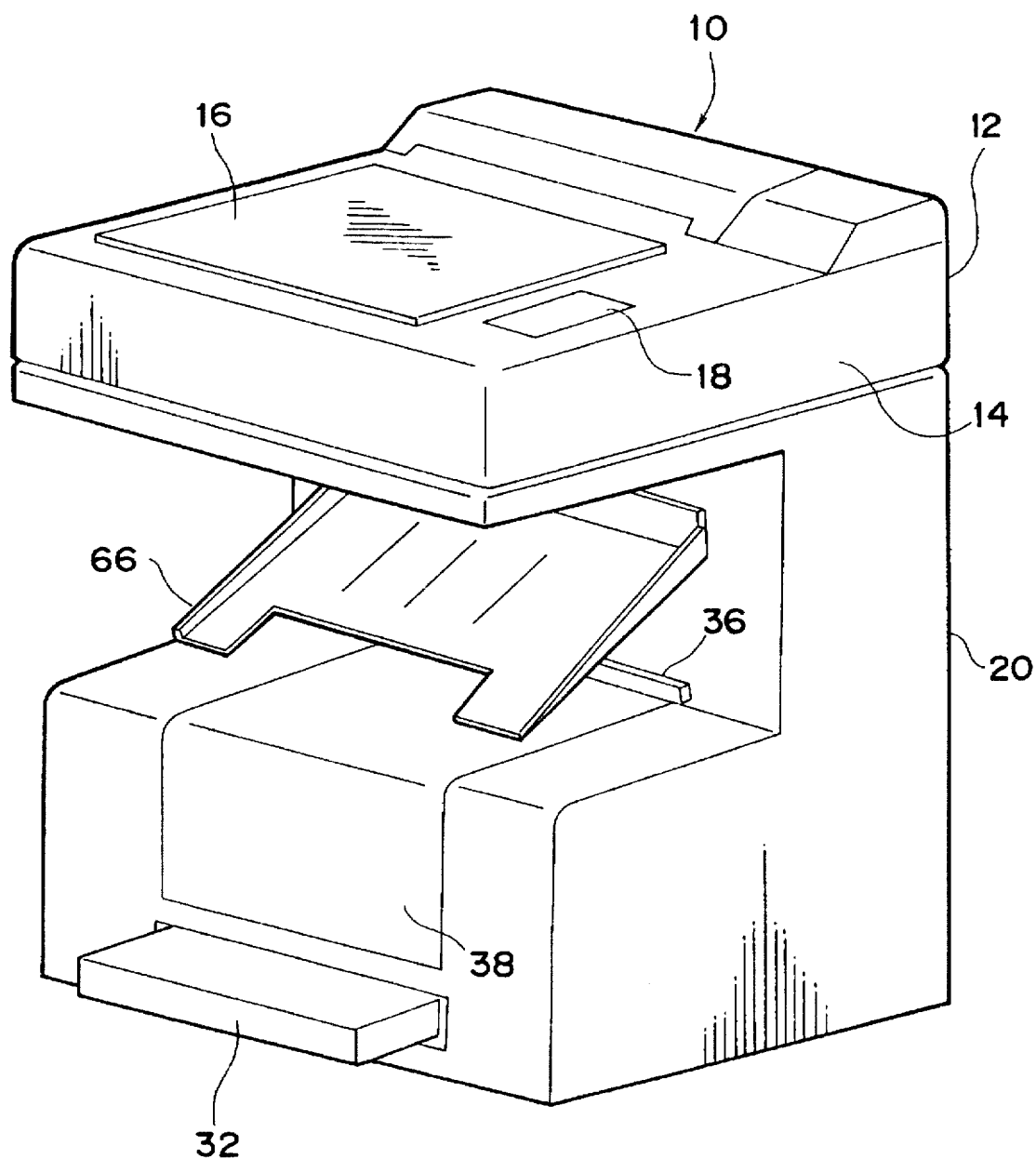
FIG. 1 is an external view of a digital color copying apparatus according to first and second embodiments of the present invention.

Referring to FIG. 1, a digital color copying apparatus 10 according to an embodiment of the present invention is composed of two main sections: a color image scanner section (referred to as "a reader unit") 12, and a printer unit 20 provided under the reader unit 12.

The reader unit 12 reads an original image placed in a top portion thereof and outputs digital color image data. The reader unit 12 has a controller unit 14 for performing various image processing of digital color image data and other functions, such as interfacing with an external apparatus.

The printer unit 20 records on recording paper the digital color image data outputted by the controller unit 14 of the reader unit 12.

The reader unit 12 has means for reading image information from a document or the like which is faced down on a document table (not shown) provided underneath a document pressing plate 16. Image information can be read from documents of various shapes and sizes, for example, a cut-sheet document, a large-size sheet document, or a document having a substantial thickness.

An operation unit 18 is provided in a portion on the top of the reader unit 12. The operation unit 18 is connected to the controller 14 and used to input a variety of information and operational instructions required for a copying operation.

The controller 14 sends the reader unit 12 and the printer unit 20 operational instructions in accordance with a variety of data inputted by means of the operation unit 18. If complicated processing, such as editing, is required, a digitizer or the like may be provided in place of the document pressing plate 16 and connected to the controller 14, thus enabling sophisticated image processing.

The printer unit 20 of the digital color copying apparatus 10 according to this embodiment is a full-color ink-jet printer employing an ink-bubble jet recording head as described in Japanese Patent Application Laid-open No. 54-59936.

The above-described two main sections, that is, the reader unit 12 and the printer unit 20, are separated from each other. Thus, they can be placed in separate locations by using a connecting cable.

These two main sections will be described in detail hereinafter with reference to FIG. 2, which schematically shows the internal structure of the digital color copying apparatus 10 shown in FIG. 1.

[Reader Unit 12]

First, the reader unit 12 of the copying apparatus 10 will be described.

The reader unit 12 comprises: an exposure lamp 22, a lens 24, and an image sensor 26 (which is a CCD sensor according to this embodiment) for reading full-color image information from a line and/or solid image. Using these means, the reader unit 12 reads an image carried by a document placed on a document glass table 28, or an image projected by projector means, or an image carried by a sheet-type document conveyed by sheet conveying means 30.

Then, the reader unit 12 and the controller unit 14 perform various image processings of image data read by the reader unit 12. The reader unit 12 sends image-processed data to the printer unit 20 for recording on recording paper.

[Printer Unit 20]

The printer unit 20 has a paper cassette 32 for containing cut sheets of a few small common sizes (within a range between about 20.9×29.6 cm and 29.6×41.8 cm in this embodiment) and a paper roll 34 for printing larger-size images (within a range between about 41.8×59.2 cm and 59.2×83.6 cm in this embodiment). The cut sheets contained in the paper cassette 32 and the roll paper 34 are selectively used in accordance with the size of an image.

Further, the copying apparatus according to this embodiment has means for manually feeding recording sheets one at a time along a cover 38 of a paper feeding portion through a manual feeding inlet 36.

Paper feeding is started by a print starting instruction from the controller unit 14. Recording paper is conveyed up to first paper-feeding rollers 44 in the following routes in accordance with feeding modes.

In the cut sheet mode, a recording cut-sheet is conveyed out from the paper cassette 32 by means of a pick-up roller 40 provided above the leading-edge side of the cut sheets contained in the paper cassette 32. The pick-up roller 40 picks up one cut sheet at a time from the very top of the pile of cut sheets inside the paper cassette 32. The thus picked-up cut sheet is conveyed to the first feeding rollers 44 by means of cut-sheet conveying rollers 42.

In the roll paper mode, the roll paper 34 is continuously unrolled by roll-paper conveying rollers 46 and cut into a common length as mentioned above by a cutter 48. The paper sheet thus cut is conveyed to the first paper feeding rollers 44.

In the manual mode, a cut sheet is manually fed in through the manual feeding inlet 36 and conveyed to the first paper feeding rollers 44 by means of manual feeding rollers 50.

The pick-up roller 40, the cut-sheet conveying rollers 42, the roll-paper conveying rollers 46, the first paper conveying rollers 44 and the manual feeding rollers 50 are driven by a paper feeding motor (not shown) (which is a DC servo motor in this embodiment). These rollers are respectively provided with electromagnetic clutches which are engaged and disengaged so as to control transmission of torque to the rollers.

A recording sheet is thus conveyed to the first paper feeding rollers 44 in the route in accordance with a selected mode. To prevent not-straight conveyance (skewing) of a recording sheet, the first paper feeding rollers 44 are not operated until the recording paper has formed a predetermined size of loop, and then the first paper feeding rollers 44 are operated to convey the recording sheet to second paper feeding rollers 52.

To facilitate precise paper conveyance in the vicinity of a recording head 56, that is, from the second paper feeding rollers 52 to paper conveying rollers 64 provided above the recording head 56, the recording paper is slackened to form a predetermined amount of buffer between the first paper feeding rollers 44 and the second paper feeding rollers 52. The amount of buffer is detected by a buffer detecting sensor 54 provided between the first paper feeding rollers 44 and the second paper feeding rollers 52. A recording sheet can be precisely conveyed by forming buffer slack of the sheet being conveyed, because such buffer slack substantially reduces the load imposed on the second paper feeding rollers 52 and the paper conveying rollers 64, particularly if a large-size recording sheet is conveyed.

A recording sheet thus conveyed is scanned for recording by the recording head 56. The recording head 56 is mounted on a scanning carriage 58, which is moved forward and backward along carriage rails 60 (in the directions perpendicular to the sheet of FIG. 2, the directions being referred to as "the main scanning directions") by a scanning motor 62. The printing head 56 performs printing while being moved forward. While the printing head 56 is being moved backward, the paper conveying rollers 64 shift the recording sheet by a predetermined amount in the sub-scanning direction (perpendicular to the main scanning directions).

The predetermined amount in the sub-scanning direction, which is later defined as "the predetermined shift", is equivalent to the dimension of the printing head 56 measured in the sub-scanning direction. It is also equivalent to the interval between suction holes (not shown) formed in a flat portion of a platen 74 facing the recording head 56. The suction holes are used to hold a recording sheet securely onto the platen 74.

The scanning motor 62 controls conveyance of a recording sheet during scanning performed by the recording head 56, while monitoring the amount of buffer slack of the recording paper by using the buffer detecting sensor 54. Thus, the amount of buffer slack is maintained at a predetermined level.

A recording sheet on which printing has been completed is treated by post-treating units 65 and 67. For instance, the recording sheet is thermally treated for drying by a heater, or the print surface of the recording sheet is chemically treated. Then, the recording sheet is discharged onto a discharge tray 66, thus completing the sequential printing operation. A discriminating circuit 69 finds whether or not the post-treating units 65 and 67 are ready; for example, whether or not a temperature has been achieved such that thermal treatment can be performed by the heater. The discriminating circuit 69, which is a known circuit, has a critical temperature value to discriminate temperatures at which the thermal treatment can be performed.

Although the recording medium is made of paper in this embodiment, it may be made of other materials such as photosensitve films.

[Scanning Carriage System]

The construction of the scanning carriage system will be described in detail.

Figure 3:
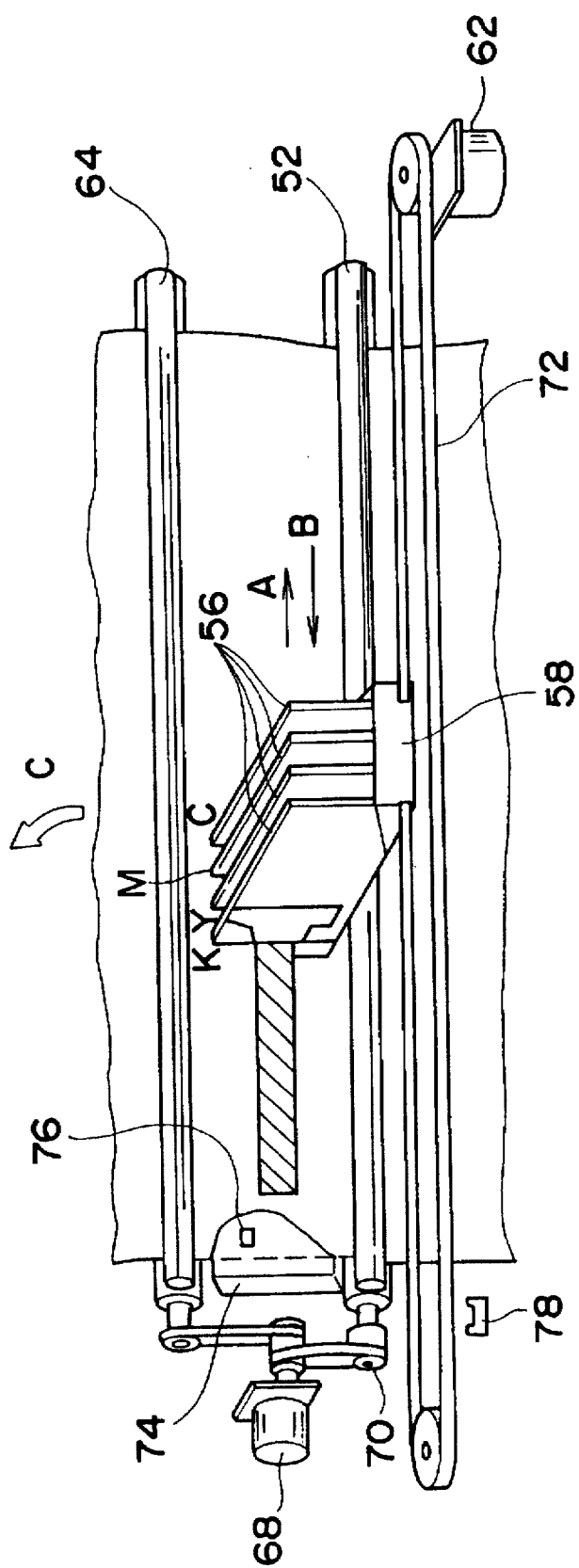
FIG. 3 illustrates an operational carriage employed in an image forming apparatus according to the first and second embodiments of the present invention.

Referring to FIG. 3, a paper conveying motor 68 operates to intermittently shift a recording sheet in the sub-scanning direction. The amount of rotation of the paper conveying motor 68 can be preset and reset. The paper conveying motor 68 drives the paper conveying rollers 64 and the second paper feeding rollers 52 by means of a second paper feeding roller clutch 70.

The above-described scanning motor 62 reciprocates the scanning carriage 58 in the main scanning directions indicated by the arrows A and B by means of a scanning belt 72.

Because the image forming apparatus according to this embodiment requires precise control over paper conveyance with a given amount of shift, pulse motors are used for the paper conveying motor 68 and the scanning motor 62.

In this embodiment, a sheet holding member (not shown) is provided in a position facing a bottom portion of the platen 74. The sheet holding member acts to fix a recording sheet onto the platen 74 during reciprocation of the scanning carriage 56, thus preventing a shift of the recording sheet during printing.

When the leading edge of a recording sheet reaches the second paper feeding rollers 52, the second paper feeding roller clutch 70 and the paper conveying motor 68 are turned on. The recording sheet is thus conveyed over the platen 74 until the leading portion of the recording sheet is sandwiched between the pair of paper conveying rollers 64. A sheet detecting sensor 76 provided on the platen 74 detects the recording sheet which has been conveyed over the platen 74. The information obtained by means of this sheet detecting sensor 76 is used for position control, jam control or the like.

When the leading edge of the recording sheet reaches the paper conveying rollers 64, the second paper feeding roller clutch 70 and the paper conveying motor 68 are turned off. Subsequently, the pressure inside the platen 74 is reduced means of a suction motor (not shown), thus drawing the recording sheet tightly onto the platen 74. Simultaneously, the above-described sheet holding member acts to temporarily fix the recording sheet onto the platen 74.

Printing is started only after the discriminating circuit 69 has determined that the post-treating units 65 and 67 are ready. The scanning carriage 58 is returned to a home position, which is detected by a home position sensor 78. Then, a forward scan is performed in the direction indicated by the arrow A.

During the forward scan, the recording head 56 selectively ejects inks: cyan C, magenta M, yellow Y, and black K, from their respective ejection nozzles, thus recording (printing) one scanning line of the image. After recording along the main scanning direction to a predetermined length, operation of the scanning motor 62 is reversed, thus moving the scanning carriage backward, that is, in the direction indicated by the arrow B. A backward scan is thus performed. The reverse operation of the scanning motor 62 is continued until the home position sensor 78 finds that the scanning carriage has returned to the home position.

During the backward scan, the paper conveying motor 68 is operated to rotate the paper conveying rollers 64 so as to shift the recording sheet by the dimension of the printed scanning line measured in the sub-scanning direction indicated by the arrow C (i.e., the width of the recording head 56 measured in the same direction). According to this embodiment, the amount of such a paper shift, more specifically, the amount of a shift of a recording sheet in the sub-scanning direction, is not necessarily the predetermined shift, that is, the width of the recording head 56. Alternatively, a sub-shift defined by the final line width may be preset as the amount of a paper shift.

The recording head 56 in this embodiment is an ink-jet recording head comprising 256 nozzles for the yellow, magenta, cyan and black inks.

When the scanning carriage 58 has returned to the home position defined by the home position sensor 78, operation for recovering the recording head 56 is performed in order to provide stable recording. The inks remaining in the nozzles of the recording head 56 are ejected to something other than the recording sheet by applying pressure to all the nozzles in accordance with pre-programmed conditions such as paper feeding time, the temperature inside the apparatus, ejection time or the like. This recovery operation prevents unstable ink ejection during the restart of ink ejection, which would otherwise be caused by fluctuations in viscosity of the inks remaining in the nozzles of the recording head 56.

The above-described process is repeated to complete recording of an image onto the entire surface of a recording sheet.

[Operation Unit]

The construction of the operation unit 18 will be described in detail with reference to FIG. 4.

Figure 4:
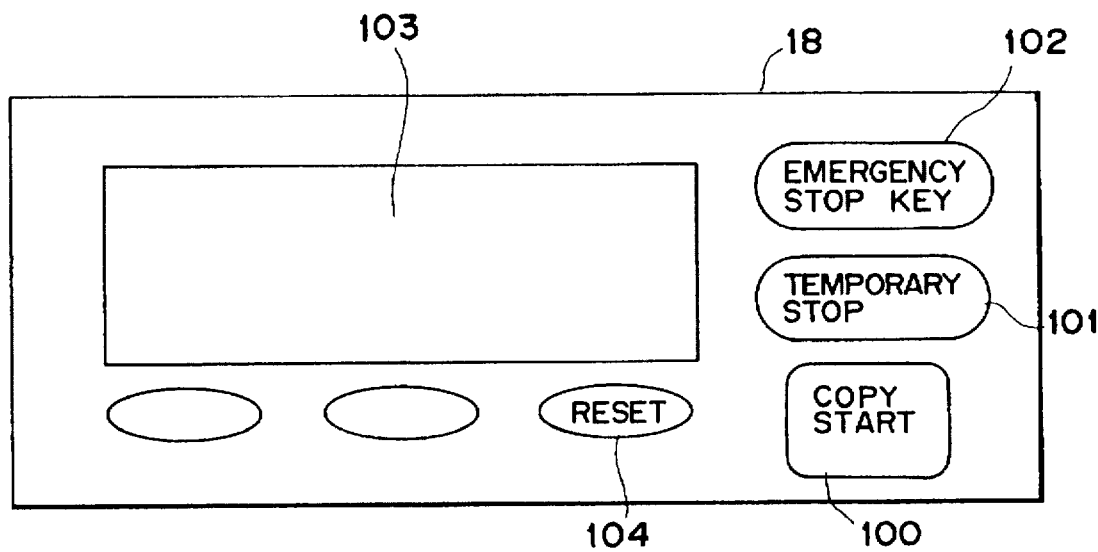
FIG. 4 illustrates the operation unit of a digital color copying apparatus according to the first embodiment of the present invention.

Referring to FIG. 4, when it is found that a copy start key 100 has been pressed, the reader unit 12 and the printer unit 20 are started to operate so as to perform copy operation.

If it is found that a temporary stop key 101 has been pressed, the scanning carriage system stops its control operation when the home position sensor 78 finds that the scanning carriage 58 has returned to the home position.

If it is found that an emergency stop key 102 has been pressed, the control operation currently executed is immediately stopped, and the slowdown of the scanning motor 62 and the paper conveying motor 68 is started. The control over this slowdown operation is programmed so that the scanning carriage 58, the paper conveying rollers 64 and the second paper feeding rollers 52 come to a stop in a short period of time. A reset switch 104 is used to instruct the recovery of the apparatus from the emergency stop state.

[Control System]

The control system of the digital color copying apparatus 10 according to this embodiment will be described with reference to FIG. 5.

Figure 5:
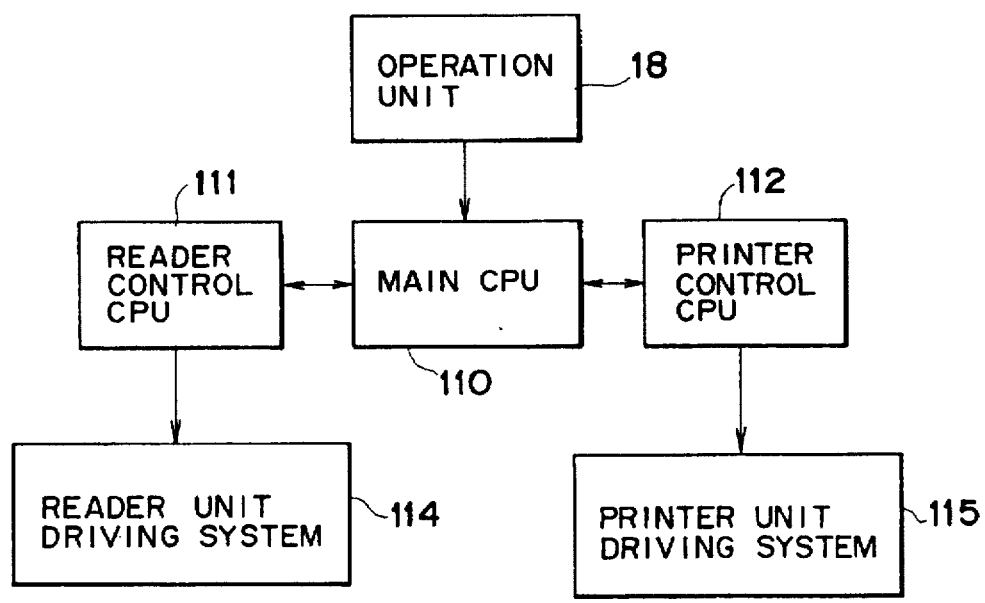
FIG. 5 is a block diagram of the control system of a digital color copying apparatus according to the first embodiment.

Referring to FIG. 5, a main CPU 110 takes the overall control of the apparatus. The main CPU 110 is connected to: a printer control CPU 112 for controlling the operation of the printer unit; a reader control CPU 111 for controlling the operation of the reader unit; and the operation unit 18 used for input by an operator.

The printer control CPU 112 and the reader control CPU 111 are preset so as to have slave-master relations with the main CPU 110. The printer control CPU 112 is connected to a printer unit driving system which drives the component units of the printer unit 20. The reader control CPU 111 is connected to a reader unit driving system which drives the component units of the reader unit 12.

Figure 6:
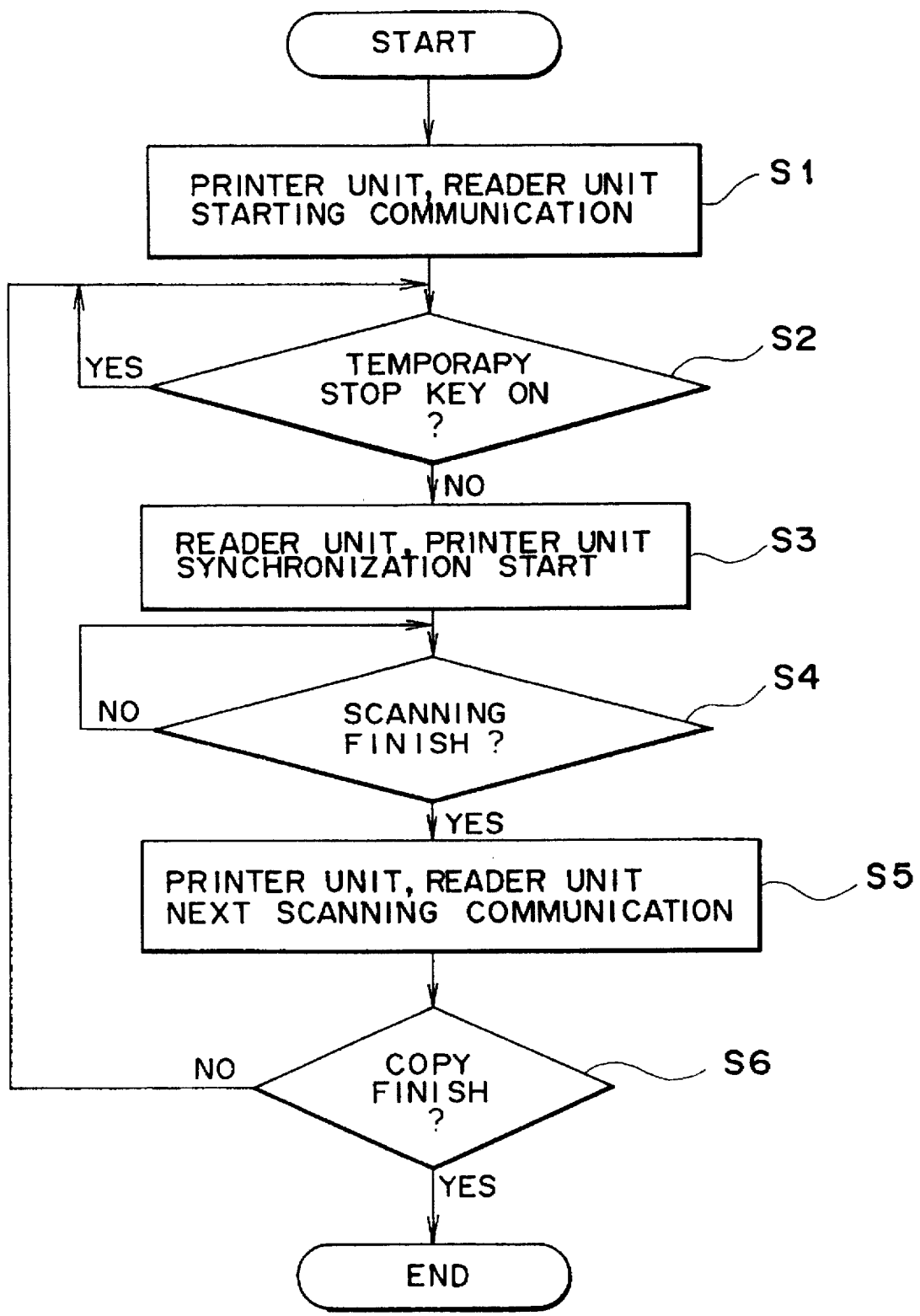
FIG. 6 is a flowchart of a copy sequence operation according to the first embodiment.

The copy operation sequence executed by the main CPU 110, the printer control CPU 112 and the reader control CPU 111 will be described in detail hereinafter with reference to the flowchart shown in FIG. 6.

When the start key 100 is pressed, a copy sequence task program is retrieved from a program memory (not shown) and the main CPU 110 proceeds to Step S1.

In Step S1, the main CPU 110 sends out data required for initial setting of the reader control CPU 111 and the printer control CPU 112. If it is found in Step S2 that the temporary stop key has not been pressed, the operation proceeds to Step S3. If it is found that the temporary stop key has been pressed, operation does not proceed to Step S3 but waits in Step S2 until the temporary stop key 101 is pressed again to cancel the temporary stop state. More specifically, the scanning carriage 58, the paper conveying rollers and other related components are put in the waiting state and thus are not operated for printing during a temporary stop.

In Step S3, the main CPU 110 transmits scan starting signals to the reader control CPU 111 and the printer control CPU 112. Thus, printing of one scanning line is started. In Step S4, the main CPU 110 waits to see that scanning by the reader units 12 and the printer unit 20 is finished. Completion of scanning of one scanning line performed by the reader unit 12 and the printer unit 20 means completion of printing of one scanning line. When a one-line scanning operation is completed, the scanning carriage 58 has returned to the home position defined by the home position sensor 78, and the recording sheet has been shifted by a predetermined amount in the sub-scanning direction.

In Step S5, the main CPU 110 transmits to the printer control CPU 112 and the reader control CPU 111 data required for the next scanning. In Step S6, the main CPU 110 determines whether or not copying of the entire image is completed, in accordance with the size of the document. If it is not completed, operation returns to Step S2 and the following steps are repeated. If copying of the entire image is completed, the main CPU 110 finishes the current copy sequential operation.

The main CPU 110 checks whether or not the temporary stop key 101 has been pressed every time printing of one scanning line has been completed. If the temporary stop key 101 has been pressed, the main CPU 110 temporarily stops the copy operation when printing of one scanning line is completed. Thus, the recording head 56 returns to the home position and waits for the next printing. Further, during a temporary stop, the cutter 48 is stopped and does not cut the roll paper. The copy operation of the image forming apparatus is restarted by pressing the temporary stop key 101 again.

Described below is an exceptional processing task program which is executed when the emergency program 102 has been pressed.

Figure 7:
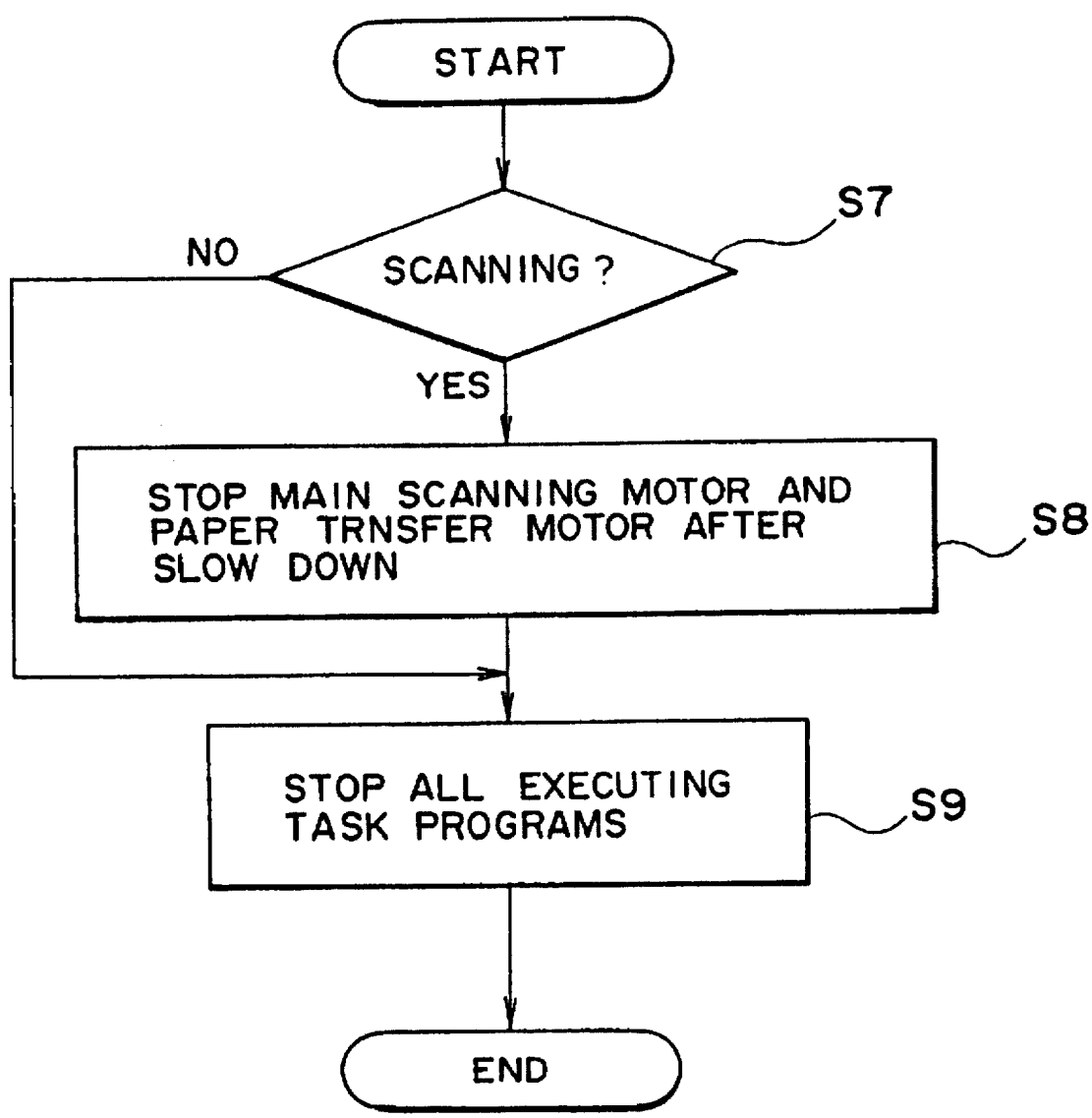
FIG. 7 is a flowchart of an emergency stop operation according to the first embodiment.

FIG. 7 is a flowchart of the operation during an emergency stop, illustrating one of the exceptional processing task programs. If the emergency stop key 102 is pressed, an exceptional processing task program is immediately retrieved from the program memory (not shown) by means of, e.g., processing for interrupting in the main CPU 10. As a result, the main CPU 110 proceeds to Step S7 shown in FIG. 7.

In Step S7, the main CPU 110 determines whether or not the printer unit 20 and the reader unit 12 are performing a scanning operation for image formation. If they are performing a scanning operation, the operation proceeds to Step S8. If not, the operation proceeds to Step S9. The "scanning operation" means an operation performed in Step S4 and Step S5 in the flowchart shown in FIG. 6. More specifically, the "scanning operation" includes initiation of scanning of the reader units 12 and the printer unit 20 in the main scanning directions, and shifting of the recording sheet by a predetermined amount in the sub-scanning direction.

In Step S8, the emergency stop is executed during a scanning operation, as described above. The speeds of the main scanning motor and the paper conveying motor are reduced at an appropriate rate so that the operation is smoothly stopped. This speed reducing control is programmed so that the scanning carriage 56, the paper conveying rollers 64 and the second paper feeding rollers 52 come to a stop in the shortest possible period. Because the emergency stop operation according to this embodiment stops the components which have been operated by gradually slowing them down instead of suddenly stopping them simply by turning off the power, the danger for damaging the components of the apparatus is substantially reduced.

After the main CPU 110 has found that the scanning operation is stopped, the main CPU 110 stops, in Step S9, all the programs that are currently being executed.

The emergency stop state can be canceled by various methods. According to the first embodiment, the operation unit 18 is provided with a reset switch, and the reset switch is used to cancel the emergency stop state of the apparatus.

Figure 8:
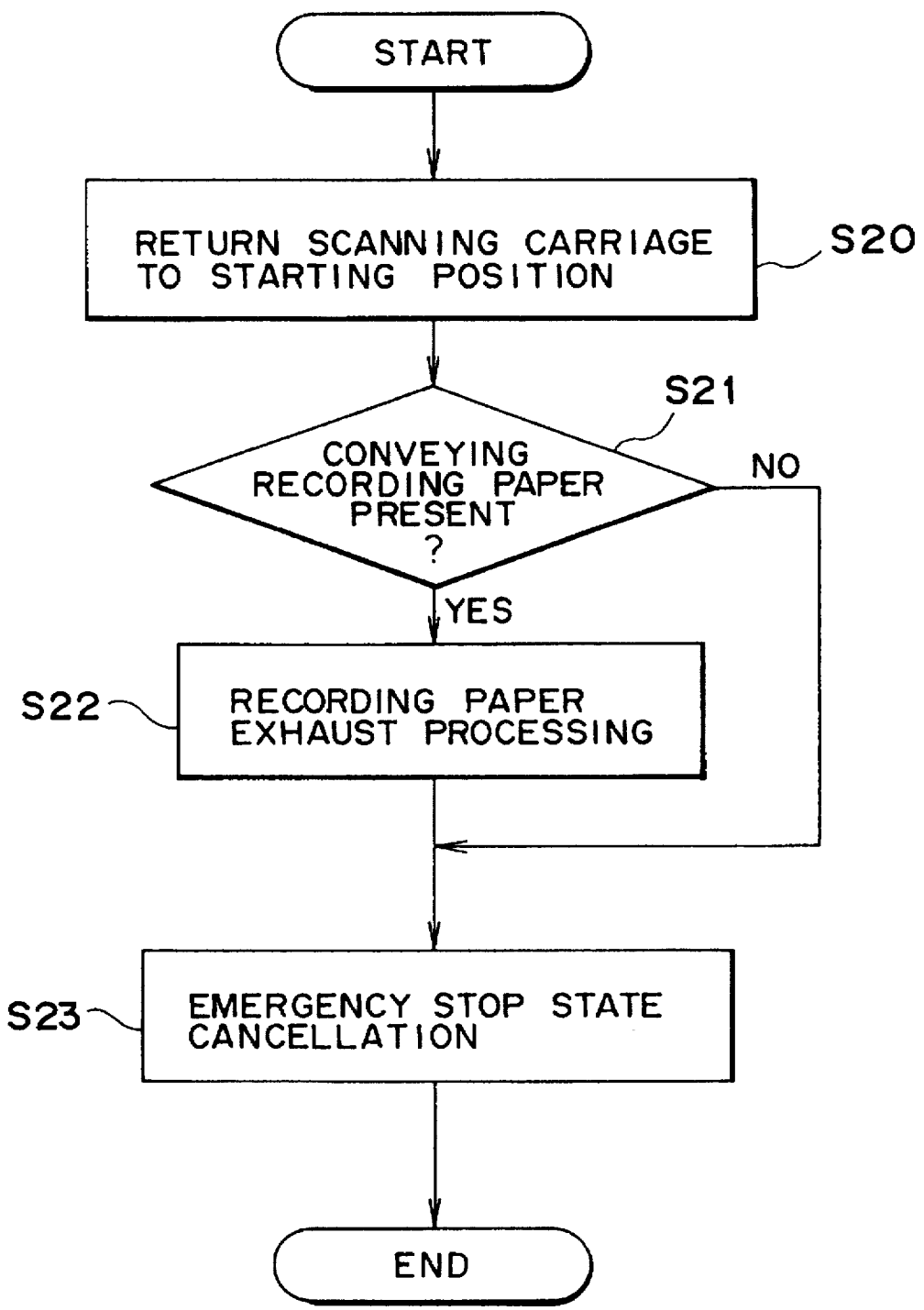
FIG. 8 is a flowchart of an emergency-stop canceling operation according to the first embodiment.

FIG. 8 is a flowchart of cancellation of the emergency stop state according to the first embodiment. If the reset switch is operated during the emergency stop state, a cancellation program is retrieved from the program memory (not shown) and, accordingly, the main CPU 110 proceeds to Step S20. In Step S20, the scanning carriage 58 is returned to the home position defined by the home position sensor 78. In Step S21, the main CPU 110 checks whether there is any recording sheet being conveyed. If there is any, operation proceeds to Step S22, where such a recording sheet is discharged.

According to this embodiment, when the emergency stop state is canceled, discharge of a standard-size cut sheet is performed differently from discharge of a recording medium having a great length, such as roll paper.

A standard-size cut sheet is discharged as follows. When the reset switch has been operated, the scanning carriage 58 is returned to the home position, and the paper conveying motor 68 is operated. The operation of the paper conveying motor 68 is continued until a predetermined time after it has been found by means of the sheet detecting sensor 76 as shown in FIG. 3 that there is no recording sheet on the platen 74. A cut sheet on which printing has been stopped part way is thus discharged onto the discharge tray 66.

A recording medium having a great length, such as roll paper, is discharged as follows. When the reset switch has been operated, the cutter 48 as shown in FIG. 2 cuts the roll paper and, simultaneously, the scanning carriage 58 is moved to the home position. Then, the paper conveying motor 68 is operated. The operation of the paper conveying motor 68 is continued until a predetermined time after discontinuation of detection of the presence of the paper on the platen by means of the sheet detecting sensor 76. The sheet is thus discharged onto the discharge tray 66.

During the stop emergency stop state, the operations of the above-mentioned post-treating units 65 and 67 are also stopped. When the emergency stop state is canceled, the remaining recording sheet is discharged no matter whether the post-processing units 65 and 67 are ready to operate, in other words, regardless of the findings of the discriminating circuit 69. Therefore, although that portion of an image formed on a recording medium before an emergency stop can not be post-treated, the recovery operation can be quickly performed. In other words, the apparatus can recover quickly from the emergency stop state so as to be responsive to an input by means of the start key 100.

However, the portion of an image formed on a recording medium before an emergency stop can be post-treated, simply by performing the above-described discharge operation only after the discriminating circuit 69 has found that the post-treating units 65 and 67 have become ready.

Further, switching means may be provided for selecting either the discharge mode in which a recording sheet is discharged regardless of the state of the post-treating units 65 and 67 or the discharge mode in which a recording sheet is discharged only after it is determined that the post-treating units 65 and 67 have become ready.

After the above-described recovery operation, the emergency stop state is canceled in Step S23. Thus, the main CPU only waits for an input by means of the start key 100.

As described above, according to the first embodiment, the temporary stop operation and the emergency stop operation can be unfailingly performed without causing any significant damage to the apparatus, simply by selectively operating the temporary stop key and the emergency stop key on the operation unit. When the temporary stop state is canceled, the apparatus can immediately restart the operation where it has been temporarily stopped. Recovery from the emergency stop state can be performed quickly. Thus, the first embodiment enhances the safety, reliability and maintainability of the apparatus. For example, if the apparatus needs maintenance, such as replenishment of inks, during the copy operation, such maintenance can be immediately performed by utilizing the temporary stop function, which guarantees a quick restart of the copy operation.

SECOND EMBODIMENT

While, according to the first embodiment, the temporary stop and the emergency stop of the copy operation are performed by pressing the temporary stop key and the emergency stop key provided in the operation unit, an image forming apparatus according to the second embodiment is able to receive a temporary stop signal and an emergency stop signal from an external apparatus and perform the temporary stop and the emergency stop in response to the respective signals.

Figure 2:
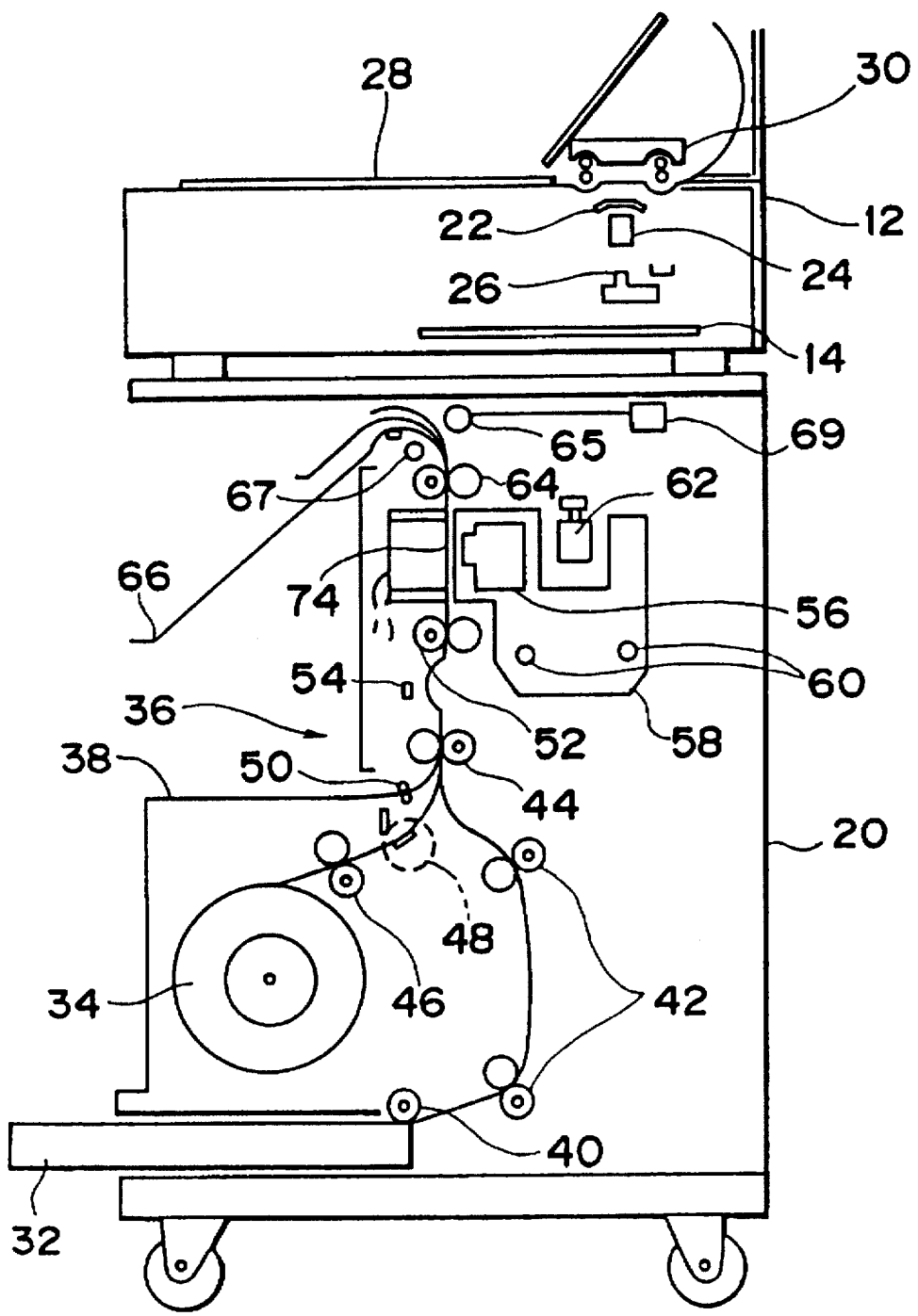
FIG. 2 is a sectional view of the digital color copying apparatus shown in FIG. 1, showing the internal structure thereof.

The image forming apparatus according to this embodiment has an exterior, an internal structure and a scanning carriage system substantially the same as those of the first embodiment as shown in FIGS. 1, 2 and 3. Therefore, description thereof will be omitted.

Figure 9:
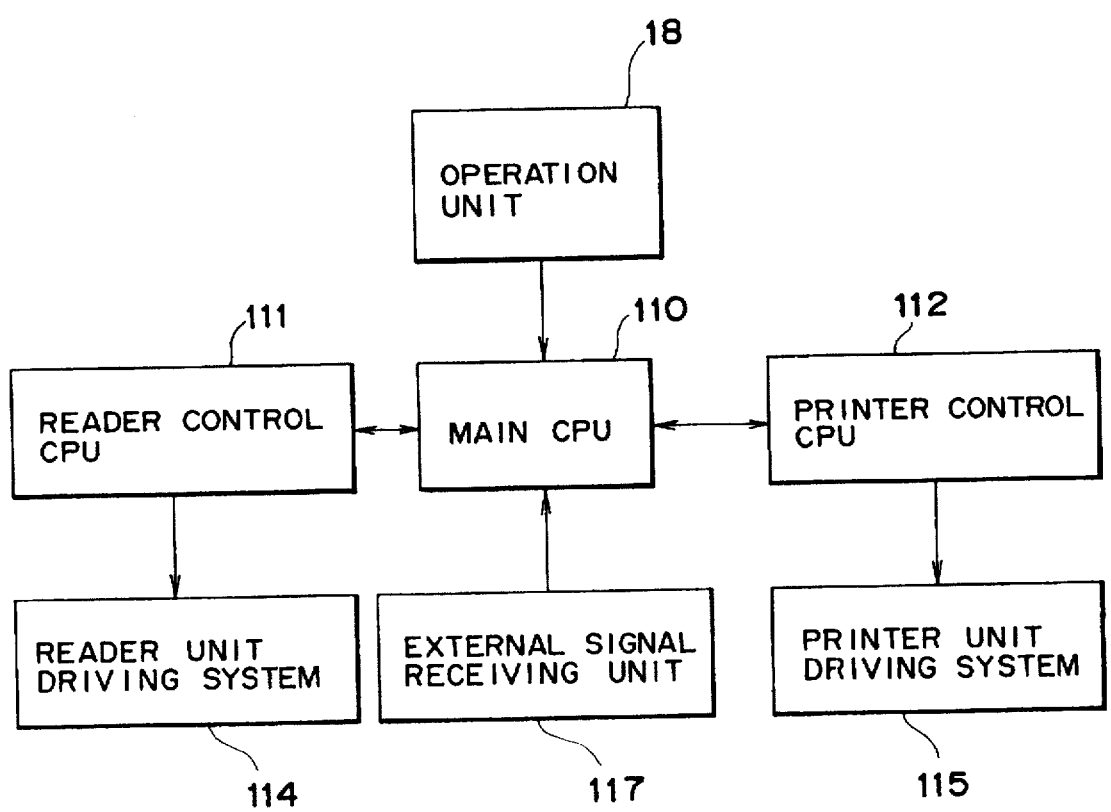
FIG. 9 is a block diagram of the control system of a digital color copying apparatus according to the second embodiment of the present invention.

FIG. 9 is a block diagram of the control system according to the second embodiment, similar to the block diagram in FIG. 5. Components comparable to those in FIG. 5 are denoted by the same numerals as in FIG. 5 and will not be described again. FIG. 9 further shows an external signal receiving unit 117 which is connected to the main CPU 110 so as to input external signals thereto.

Figure 10:
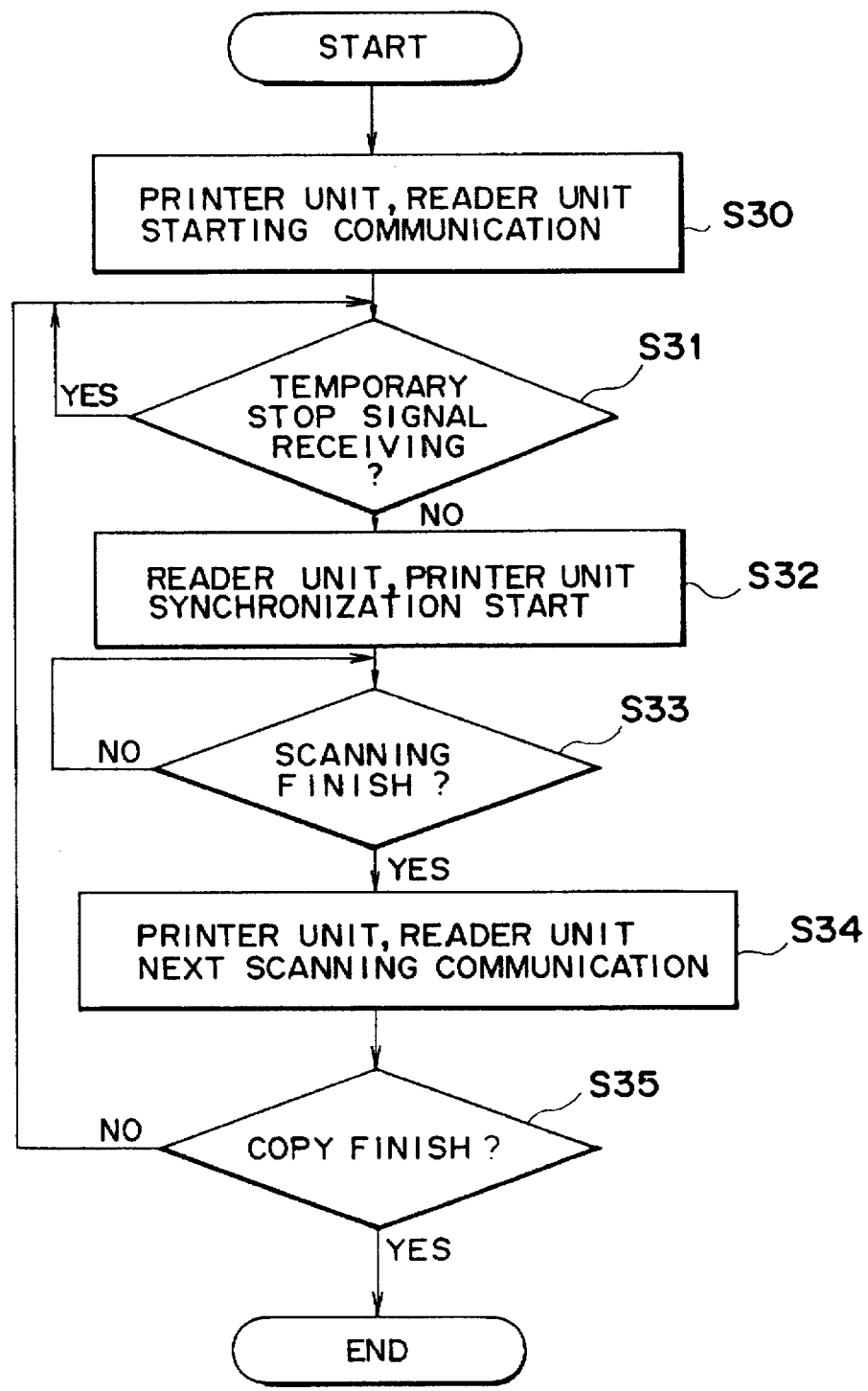
FIG. 10 is a flowchart of a copy sequence operation according to the second embodiment.

FIG. 10 is a flowchart of a copy sequential operation of an image forming apparatus according to the second embodiment.

When the main CPU 110 has received a copy signal generated either by means of the start key 100 provided in the operation unit 18 or by operation of an external apparatus connected to the external signal receiving unit 117, a copy sequence task program is retrieved from a program memory (not shown). Thus, the CPU 110 proceeds to Step S30 as shown in FIG. 10.

In Step S30, the main CPU 110 transmits to the reader control CPU 111 and the printer control CPU 112 data required for initial setting of these CPUs, thus accordingly performing the initial setting thereof. If it is found that the main CPU 110 has not received a temporary stop signal in Step S31, the operation proceeds to Step S32. If the main CPU 110 has received a temporary stop signal and, accordingly, the apparatus is in the temporary stop state, the operation waits in Step S31 until the temporary stop signal is canceled. More specifically, while the CPU 110 is receiving temporary stop signals, the scanning carriage 58, the paper conveying rollers and other components are in the standby state and are not operated for printing.

In Step S32, the main CPU 110 transmits scan start signals to the reader control CPU 111 and the printer control CPU 112. Scan of one scanning line is thus started. In Step S33, the main CPU 110 waits for the reader unit 12 and the printer 20 to finish this one-line scanning. Completion of scanning of one line means completion of printing of one line. When a one-line scanning operation is completed, the scanning carriage 58 has returned to the home position defined by the home position sensor 78, and the recording sheet has been shifted by a predetermined amount in the sub-scanning direction.

In Step S34, the main CPU 110 transmits data required for the next scanning to the printer control CPU 112 and the reader control CPU 111. In Step S35, the main CPU 110 determines whether or not copying of the entire image is completed, in accordance with the size of the document. If it is not completed, operation returns to Step S31 and the following steps are repeated. If it is completed, the main CPU 110 finishes the current copy sequential operation.

The main CPU 110 checks whether or not a temporary stop signal from the external apparatus is being received every time printing of one scanning line has been completed. If a temporary stop signal is being received, the main CPU 110 is able to temporarily stop the copy operation when printing of one scanning line is completed. The copy operation of the image forming apparatus is restarted by canceling (disabling) the temporary stop signal.

If the external receiving unit 117 has received an emergency stop signal from an external apparatus, the CPU 110 performs an emergency stop operation similar to the comparable operation according to the first embodiment illustrated by the flowchart shown in FIG. 7. The flowchart shown in FIG. 7 will not be described again. The emergency stop state is canceled when the emergency stop signal from the external apparatus is canceled or when a reset signal is inputted. Cancellation of the emergency stop state is performed by an operation similar to the comparable operation according to the first embodiment illustrated by the flowchart shown in FIG. 8.

As described above, since an image forming apparatus according to the second embodiment is able to receive temporary stop signals and emergency stop signals from an external apparatus, the temporary stop and the emergency stop of printing operation of the image forming apparatus can be performed by using an external apparatus. Similar to the first embodiment, when the temporary stop state is canceled, the apparatus can immediately restart the operation where it has been temporarily stopped. Further, recovery from the emergency stop state can be performed quickly. Thus, the second embodiment also enhances the safety, reliability and maintainability of the apparatus. For example, if the apparatus needs maintenance, such as replenishment of inks, during the copy operation, such maintenance can be immediately performed by utilizing the temporary stop function, which guarantees a quick restart of the copy operation.

The input means for inputting a temporary stop signal, an emergency stop signal and signals for canceling these signals is not limited to the means described above. On the contrary, the signal input means can be modified in various ways. For example, a switch for canceling a temporary stop signal may be separately provided, or a signal indicating the temporary stop state may be latched by means of hardware or software.

Further, although the recording head scanning system and the recording medium conveying system are inseparable according to the above embodiments, the present invention can be applied to an image forming apparatus in which the two systems are separable and each system has its own control system.

The present invention provides great advantages particularly in an image forming apparatus having an ink-jet recording head which uses thermal energy to form ink droplets for ejection.

Preferably, the construction and principles of the ink-jet recording head should be in accordance with the basic principles disclosed in, e.g., the specifications of U.S. Pat. Nos. 4,723,129 and 4,740,796. The principle method disclosed therein is applicable to both a so-called on-demand type and a so-called continuous type of ink-jet recording head. The principle method is particularly effective for the on-demand type. In this type of ink-jet recording head, electricity-heat converters arranged so as to correspond to liquid passages or sheets retaining liquid (ink) generate thermal energy when receiving at least one drive signal which corresponds to recording data and which causes a rapid temperature increase greater than a temperature increase causing nucleate boiling. Therefore, the thermal energy generated by the electricity-heat converters causes film boiling at the heat acting surface of the recording head. As a result, the drive signals create bubbles in the liquid (ink) on the basis of a one-to-one correspondence. As a bubble grows and shrinks, a portion of the liquid (ink) is ejected through an ejection opening, thus forming at least one droplet. More preferably, the drive signals should have pulse forms, because a pulse drive signal induces instant and suitable growth and shrinkage of a bubble, thus enhancing the responsiveness of ink ejection.

Examples of the suitable drive signals having pulse forms are disclosed in the specifications of U.S. Pat. Nos. 4,463,359 and 4,345,262. Further, excellent printing can be achieved by employing the conditions described in U.S. Pat. No. 4,313,124, which relates to a temperature increase rate at the heat acting surface.

The recording head may be constructed based on not only the above-mentioned specifications, each of which discloses a combination structures of ejection openings, liquid passages and electricity-heat converters, but also the specifications of U.S. Pat. Nos. 4,558,333 and 4,459,600 each disclosing a structure in which a heat acting surface is provided in a bent region.

Further, the recording head may be constructed based on Japanese Patent Application Laid-open No. 59-123670, which discloses a structure in which a plurality of electricity-heat converters are provided with a single slit and the slit is used as an ejection opening, or Japanese Patent Application Laid-open No. 59-138461, which discloses a structure in which an opening for absorbing thermal energy waves is positioned so as to correspond to an ejection portion.

An image forming apparatus according to the present invention may employ a full-line type recording head having a length substantially equal to the width of the largest-size recording medium that can be used in the apparatus. Such a full-line type recording head may be constructed by assembling a plurality of recording heads as disclosed in the above specifications or may be constructed as one unit recording head.

Further, an image forming apparatus according to the present invention may employ a replaceable chip-type recording head which is detachably connected to the apparatus not only electrically but also in terms of the ink supply, or a cartridge type recording head having an ink tank connected thereto.

The recording head should preferably be provided with recovery means and auxiliary means because these means enhance the advantages of the present invention. Examples of these means are: capping means; cleaning means; pressure and/or suction means; and preheating means comprising an electricity-heat converter and/or a heating device. Further, the recording head may employ a pre-ejection mode for ejecting the liquid (ink) while printing is not being performed. Such mode is effective for stable printing.

An image forming apparatus according to the present invention may employ not only a single color recording mode using a single color for printing, such as black, but also a plural color recording mode using different colors or a full color recording mode producing mixed colors, by using a suitable recording head constructed by combining a plurality of recording heads or constructed as a one-unit recording head.

Although the inks used by image forming apparatus according to the above-described embodiments have been simply described as liquid inks, various types of inks can be used. For example, the inks may solidify at a room temperature or lower, and soften or liquefy at a room temperature or lower. Further, because an ink-jet type image forming apparatus in general controls the viscosity of an ink so as to achieve stable ink ejection by maintaining the temperature of the ink within a range between 30° C. and 70° C., various types of inks can be used in such an image forming apparatus as long as they are in the liquid state when a recording signal is applied to the electricity-heat converter or the like.

Further, an image forming apparatus according to the present invention may use a solid ink which liquefies when receiving thermal energy, for example: a solid ink which liquefies when receiving thermal energy produced in correspondence to a recording signal and, therefore, is ejected in the form of liquid; and a solid ink which is liquefied and ejected in a similar manner but starts solidifying before reaching a recording medium. Such a solid-type ink is used for the purpose of preventing evaporation of the ink or preventing an excessive increase of the ink temperature due to consumption of the applied thermal energy for liquefaction of the solid ink. Such an ink may be retained in recess portions of a porous sheet or through holes facing the electricity-heat converters, as described in Japanese Patent Application Laid-open Nos. 54-56847 and 60-71260. According to the present invention, the above-described film-boiling method is very suitable for ejecting the above-described inks.

Although the present invention has been described with reference to image forming apparatus having ink-jet recording heads, the present invention is not limited to such an apparatus. The present invention can be applied to other types of image forming apparatuses, for example, an image forming apparatus having a heat-transfer recording head.

Further, the present invention can be applied to a unit apparatus for forming images or an image forming system composed of a plurality of apparatuses. Still further, the present invention can be achieved by providing a program according to the present invention in an image forming apparatus or system.

The recording medium used by an image forming apparatus according to the present invention is not limited to roll paper but may be paper folded in an accordion manner, and may be made of paper or other material.

As described above, an image forming apparatus according to the present invention is able to unfailingly perform an emergency stop operation without causing any significant damage to the apparatus, in response to an emergency stop signal generated by means of the operation unit or received from an external apparatus. Further, if there is a need for maintenance, such as replenishment of inks, during the copy operation, the image forming apparatus of the present invention is able to temporarily stop the copy operation in response to a temporary stop signal generated by means of the operation unit or received from an external apparatus. After that, the apparatus can easily restart the copy operation. Thus, the present invention enhances the safety, reliability and maintainability of an image forming apparatus.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

What is claimed is:

1. An image forming apparatus comprising:
    image forming means for forming an image by performing a record-scan a plurality of times;
    temporary stop signal input means for inputting a temporary stop signal designating a temporary stop of an image forming operation for forming the image on one recording medium;
    emergency stop signal input means for inputting an emergency stop signal designating an emergency stop of the image forming operation for forming the image on one recording medium;
    temporary stop cancellation signal input means for inputting a temporary stop cancellation signal designating cancellation of the temporary stop of the image forming operation;
    emergency stop cancellation signal input means for inputting an emergency stop cancellation signal designating cancellation of the emergency stop of the image forming operation;
    determination means for determining whether the temporary stop signal has been inputted before said image forming means performs record-scanning;
    hold means for suspending record-scanning when said determination means determines that the temporary stop signal has been inputted;
    temporary stop cancellation means for restarting record-scanning which has been suspended, in response to input of the temporary stop cancellation signal;
    emergency stop means for immediately stopping operations related to image formation in response to input of the emergency stop signal, and for placing said image forming apparatus in an emergency stop state; and
    emergency stop cancellation means for cancelling the emergency stop state in response to input of the emergency stop cancellation signal.

2. An image forming apparatus according to claim 1, further comprising an operation unit for designating operations, wherein at least one of input of the temporary stop signal performed by said temporary stop signal input means and input of the temporary stop cancellation signal performed by said temporary stop cancellation signal input means are performed in response to operation of said operation unit.

3. An image forming apparatus according to claim 1, further comprising connection means for receiving an operation signal from an external apparatus, wherein at least one of input of the temporary stop signal performed by said temporary stop signal input means and input of the temporary stop cancellation signal performed by said temporary stop cancellation signal input means are performed in response to the operation signal received by said connection means.

4. An image forming apparatus according to claim 1, further comprising an operation unit comprising a switch and is used to designate various operations, wherein at least one of input of the emergency stop signal performed by said emergency stop signal input means and input of the emergency stop cancellation signal performed by said emergency stop cancellation signal input means are performed in response to an operation of said switch of said operation unit.

5. An image forming apparatus according to claim 1, further comprising connection means for receiving an operation signal from an external apparatus, wherein at least one of input of the emergency stop signal performed by said emergency stop signal input means and input of the emergency stop cancellation signal performed by said emergency stop cancellation signal input means are performed in response to the operation signal received by said connection means.

6. An image forming apparatus according to claim 1, wherein said image forming means forms the image on the recording medium by ejecting an ink.

7. An image forming apparatus according to claim 6, wherein said image forming means comprises heat energy generating means for applying a heat energy to the ink and ejects the ink by causing a state change in the ink by the heat energy.

8. An image forming apparatus including recording means and scanning means for relatively scanning a recording medium with the recording means, for forming an image on the recording medium by scanning the recording medium with the recording means plural times, said apparatus comprising:

control means for causing an image formation operation for forming the image on one recording medium, including scanning of the recording means by the scanning means, to be stopped in response to a first stop signal and causing the image formation operation to be stopped in response to a second stop signal after a predetermined scanning of the recording means by the scanning means; and releasing means for causing a state in which the image is formable in response to a release signal for releasing the stopped image formation operation, wherein said releasing means causes the image formation operation to be sequentially resumed after the image formation operation is stopped only when the image formation operation is stopped by the second stop signal, wherein said control means causes the recording means to be moved to a predetermined position out of a recording area by the scanning means when the image formation operation is stopped in response to the second stop signal.

9. An image forming apparatus according to claim 8, wherein the recording means forms the image on the recording medium by ejecting an ink.

10. An image forming apparatus according to claim 9, wherein the recording means comprises heat energy generating means for applying heat energy to the ink and ejects the ink by causing a state change in the ink by the heat energy.

11. An image forming apparatus according to claim 8, wherein the recording medium comprises a rolled recording medium.

12. An image forming apparatus according to claim 11, further comprising cutting means for cutting the rolled recording medium, wherein said releasing means causes the state in which the image is formable in response to the release signal and causes the recording medium to be cut by said cutting means.

13. An image forming apparatus according to claim 8, further comprising post-treatment means for post-treating the recording medium after the image has been formed on the recording medium by the recording means.

14. An image forming apparatus according to claim 13, wherein said post-treatment means applies heat to the recording medium.

15. An image forming apparatus according to claim 8, further comprising:

first stop signal generating means for generating the first stop signal;

second stop signal generating means for generating the second stop signal; and release signal generating means for generating the release signal.

16. An image forming apparatus according to claim 15, further comprising operating means for effecting the image formation operation, wherein said first stop signal generating means, said second stop signal generating means and said release signal generating means are comprised in said operating means.

17. An image forming apparatus according to claim 8, further comprising operating means for effecting the image formation operation, wherein the first stop signal, the second stop signal and the release signal are generated by said operating means.

18. An image forming apparatus according to claim 8, further comprising receiving means for receiving a signal from an external source, wherein the first stop signal, the second stop signal and the release signal are received by said receiving means.

19. An image forming apparatus according to claim 8, wherein said control means causes the image formation operation to be stopped after a scanning is performed by reducing a speed of scanning of the recording means by a predetermined amount less than a scanning speed by the scanning means during normal recording when the first stop signal is generated.

20. An image forming apparatus having a recording head and a main-scanning means for relatively main-scanning a recording medium with said recording head for forming an image on the recording medium by an image forming operation which executes main-scanning of the recording medium with the recording head plural times, said apparatus comprising:

temporary stop means for temporarily stopping the image forming operation for forming the image on one recording medium, wherein the main-scanning of said recording head by said main-scanning means is suspended when said temporary stop means temporarily stops the image forming operation;

cancel instruction means for instructing cancellation of the temporary stop of the image forming operation; and temporary stop cancellation means for restarting the main-scanning of said recording head suspended when said cancel instruction means instructs the cancellation of the temporary stop of the image forming operation.

21. An image forming apparatus according to claim 20, further comprising emergency stop means for immediately stopping the image forming operation.

22. An image forming apparatus according to claim 20, wherein said temporary stop means temporarily stops the image forming operation when the main-scanning by said main-scanning means is finished.

23. An image forming apparatus according to claim 22, further comprising stop instruction means for instructing the temporary stop by said temporary stop means, and wherein said temporary stop means temporarily stops the image forming operation when the main-scanning which is being executed when said instruction means instructs the temporary stop is finished.

24. An image forming apparatus according to claim 22, further comprising stop instruction means for instructing the temporary stop by said temporary stop means and wherein said temporary stop means temporarily stops the image forming operation when a predetermined number of main-scannings by said main-scanning means is finished after the temporary stop is instructed by said stop instruction means.

25. An image forming apparatus according to claim 20, further comprising connection means for receiving an operation signal from an external apparatus, wherein said temporary stop means receives the operation signal to temporarily stop the image forming operation.

26. An image forming apparatus according to claim 20, further comprising an operation unit for generating an operation signal, wherein said temporary stop means receives the operation signal to temporarily stop the image forming operation.

27. An image forming apparatus according to claim 20, wherein said recording head forms the image by ejecting ink.

28. An image forming apparatus according to claim 27, wherein said recording head comprises heat energy generating means for applying a heat energy to the ink and ejects the ink by causing a state change in the ink by the heat energy.

29. An image forming apparatus according to claim 20, further comprising connection means for receiving an operation signal from an external apparatus, wherein said cancel instruction means receives the operation signal to instruct cancellation of the temporary stop.

30. An image forming apparatus according to claim 20, further comprising an operation unit for generating an operation signal, wherein said cancel instruction means receives the operation signal to instruct cancellation of the temporary stop.

* * * * *